(12) United States Patent
Ramakrishnan et al.

(10) Patent No.: US 7,886,591 B2
(45) Date of Patent: Feb. 15, 2011

(54) METHOD FOR IMPROVING THE DETERMINATION OF EARTH FORMATION PROPERTIES

(75) Inventors: Terizhandur S. Ramakrishnan, Boxborough, MA (US); Fikri John Kuchuk, Meudon (FR); Yusuf Bilgin Altundas, Somerville, MA (US); Lang Zhan, Pearland, TX (US)

(73) Assignee: Schlumberger Technology Corporation, Cambridge, MA (US)

( * ) Notice: Subject to any disclaimer, the term of this patent is extended or adjusted under 35 U.S.C. 154(b) by 414 days.

(21) Appl. No.: 12/041,576

(22) Filed: Mar. 3, 2008

(65) Prior Publication Data

US 2008/0210420 A1 Sep. 4, 2008

Related U.S. Application Data

(60) Provisional application No. 60/892,287, filed on Mar. 1, 2007.

(51) Int. Cl.
*G01N 15/08* (2006.01)
*E21B 47/10* (2006.01)

(52) U.S. Cl. ..................... 73/152.41; 702/12
(58) Field of Classification Search ............. 73/152.39, 73/152.41, 152.42; 702/12
See application file for complete search history.

(56) References Cited

U.S. PATENT DOCUMENTS

| | | | |
|---|---|---|---|
| 4,052,893 A * | 10/1977 | Murphy et al. ........... 73/152.08 |
| 5,068,043 A * | 11/1991 | Thigpen et al. ............. 507/213 |
| 5,157,605 A | 10/1992 | Chandler et al. |
| 5,214,384 A * | 5/1993 | Sprunt et al. ................ 324/351 |
| 5,335,542 A | 8/1994 | Ramakrishnan et al. |
| 5,497,321 A | 3/1996 | Ramakrishnan et al. |
| 6,061,634 A | 5/2000 | Belani et al. |
| 6,886,632 B2 * | 5/2005 | Raghuraman et al. .... 166/252.4 |
| 7,555,390 B2 | 6/2009 | Ramakrishnan |

OTHER PUBLICATIONS

Ramakrishnan, T.S., et al., Formation producibility and fractional flow curves from radial resistivity variation caused by drilling fluid invasion, Physics of Fluids, American Institute of Physics, vol. 9, Issue 4, Apr. 1997, pp. 833-844.

Buckley, S.E., et al., Mechanism of Fluid Displacement in Sands, Transactions of the American Institute of Mining, Metallurgical, and Petroleum Engineers, New York Meeting, 146, Feb. 1941, pp. 107-116.

(Continued)

*Primary Examiner*—John Fitzgerald
(74) *Attorney, Agent, or Firm*—Vincent Loccisano; James McAleenan; Brigid Laffey

(57) ABSTRACT

Methods and apparatus for improving the determination of at least one multiphase flow parameter of an earth formation comprising propagating within the formation a first salinity front, determining a first value of the at least one multiphase flow parameter, propagating in the formation a second salinity front and improving the determination of the at least one multiphase flow parameter from the first value for the at least one multiphase flow parameter and a saturation profile associated with the first and second salinity fronts within the formation.

19 Claims, 1 Drawing Sheet

OTHER PUBLICATIONS

Zeybek, M., et al., Estimating Multiphase-Flow Properties From Dual-Packer Formation-Tester Interval Tests and Openhole Array Resistivity Measurements, SPE Reservoir Evaluation & Engineering 7, Feb. 2001, pp. 40-46.

Hammond, P.S., One- and Two-Phase Flow During Fluid Sampling by a Wireline Tool, Transport in Porous Media 6, 1991, pp. 299-330.

Morel-Seytoux, H.J., Introduction to Flow of Immiscible Liquids in Porous Media, in Flow Through Porous Media edited by DeWeist, J.M., Academic Press, New York, 1969, pp. 455-516.

Ramakrishnan, T.S. et al., Water-Cut and Fractional-Flow Logs From Array-Induction Measurements, SPE Reservoir Eval. & Eng. vol. 2, No. 1, Feb. 1999, pp. 85-94.

* cited by examiner

METHOD FOR IMPROVING THE DETERMINATION OF EARTH FORMATION PROPERTIES

CROSS-REFERENCE TO RELATED APPLICATIONS

This application claims benefits from U.S. Provisional Patent Application No. 60/892,287 filed Mar. 1, 2007, the contents of which are hereby incorporated herein by reference.

BACKGROUND OF THE INVENTION

1. Field of the Invention

The present invention relates broadly to apparatus and method for investigating subsurface earth formations. More particularly, the present invention related to borehole tool and methods for improving the determination of at least one multiphase flow parameter of a formation traversed by a borehole. For purposes herein, the term "borehole" when utilised by itself or in conjunction with the word "tool" is to be understood in its broadest sense to apply to partly-cased and uncased boreholes and wells.

2. State of the Art

The determinations of multiphase flow parameters, like relative permeability and other hydraulic properties of formations surrounding boreholes such as capillary pressure are very useful for analyzing, through simulation or analytical techniques, multiphase fluid flow in reservoirs, and in obtaining an overall understanding of the structure of the formations. For the reservoir engineer, relative permeabilities are generally considered to be fundamental reservoir multiphase properties, the determinations of which is next only in importance to the determination of porosity, fluid saturations, formation pressure and permeability. Indeed, determinations of relative permeabilities to oil and water are crucial for forecasting oil recovery during water flooding or natural water drives. The economic viability of a reservoir therefore depends upon the nature of these saturation dependent permeabilities. Capillary pressure determines the original phase distributions in reservoirs and to some extent affects the movement of fluids across the reservoir strata. The movement of the fluids however is largely determined by the single phase and relative permeability.

Before production, when obtainable, cores of the formation provide important data concerning permeability, capillary pressure and relative permeabilities. However, cores are difficult and expensive to obtain, and core analysis is time consuming and provides information about very small sample volumes.

Aside from being an expensive proposition, several serious drawbacks to using core-plugs cannot be overlooked. Firstly, core plugs used in the laboratory experiments usually are limited to an inch or two lateral to the wellbore. Therefore, cores do not normally capture properties on a scale relevant to fluid displacement in a reservoir. Measured properties suffer from inaccuracies introduced in the laboratory that are all too common in relative permeability experiments. Furthermore, data has to be scaled up from inch scale onto grid block scale in the simulation model which can be of the order of tens of feet in the vertical direction (normal to the bedding pane) and hundreds of feet in the horizontal direction. These large simulation blocks contain heterogeneities that are not included in the original core measurements.

Even if one obtains fine-scale core data, upscaling methods are notoriously unreliable and are imperfect. There is no guarantee that any such scale-up will be reliable in strongly heterogeneous reservoirs, especially carbonates. A better solution, yielding measured properties at a scale useful for making improved predictions is therefore highly desirable.

Additionally, the retrieved cores for laboratory experiments may not be representative of the reservoir rock due to permanent changes in wettability, pore structure, and physics and chemistry of fluid interactions during coring, transportation, cleaning and restoration. The properties of formation fluids may also change after they are lifted from the reservoir to the surface. In view of this, a technique that can provide measurement or estimate of in situ petrophysical properties is necessary.

Furthermore, coring, core handling and surface laboratory work are very time-consuming and expensive. For example, restoration of the core to original wettability conditions after cleaning contaminations resulting from drilling fluids often requires as long as 1000 hours of aging. Furthermore, each core has to be measured individually for all required properties. To cover the entire formation thickness of highly heterogeneous carbonate reservoirs, significant amount of laboratory work must be done. These limitations lead to the prolonged data processing time from core collection to result presentation. Hence, a more reliable, faster, simpler and cheaper technology is needed in obtaining the relative permeability and capillary pressure.

Co-owned U.S. Pat. No. 5,335,542, which is hereby incorporated by reference herein in its entirety, proposed to characterize formation properties by combining probe pressure measurements with resistivity measurements from electrodes mounted on the pad in wireline formation tester. As fluid is withdrawn or injected into the formation at known rates, the fluid pressure of the formation is obtained, and electromagnetic data is obtained by the electrodes. The electromagnetic and fluid pressure data are then processed using various formation and tool models to obtain relative permeability information, endpoint permeability, wettability, etc. While the tool and method of co-owned U.S. Pat. No. 5,335,542 is believed to be effective in providing important relative permeability and other information, it will be appreciated that in order to gather information from which the desired determinations are made, the borehole tool must be in contact with the formation. Thus, the data gathering process is time consuming and data is limited to specific locations, although information regarding other locations can be generated from the data obtained at the specific locations. In addition, while some depth of investigation is obtained, the interpretation does not extend to a reservoir length scale.

It is also possible to obtain formation properties related to multiphase flow, such as relative permeability and fractional flow function, from the acquired data using techniques outlined by co-owned U.S. Pat. No. 5,497,321, which recites an open hole logging tool capable of providing a log of fractional flow characteristics of formations surrounding an earth borehole or by co-owned U.S. patent application Ser. No. 11/854,320 titled "Petrophysical interpretation of multipass array resistivity logs obtained while drilling" which recites the stacking of single pass resistivity data with different depths of investigation obtained during different passes such that this stacked data may be jointly inverted. These aforementioned references are herein incorporated by reference in their entirety. However, because of the small diameter of probes and electrodes, and short spaces between coils used in the invention, the U.S. Pat. No. 5,497,321's technique limits the depth of investigation to just a few feet.

To circumvent the small scale limitation of wireline formation tester, a technique that uses pressure and resistivity measurements along with a water injection/fall-off test has been proposed by co-owned U.S. Pat. No. 6,061,634, which is hereby incorporated by reference herein in its entirety. This invention utilizes a pressure sensor, a flow meter and multiple ring-shaped electrodes mounted on the peripheral surface of a wireline tool body along its axial direction to measure pressure, flow rate and electrical data during water injection when the tool is set in the borehole opposite the formation to be investigated.

The pressure signal can be used to infer the mobility of the fluids in the formation based on well-established pressure transient test theory for injection/fall-off test. The interpretation of electrical data is a variant of the method of U.S. Pat. No. 5,497,321. This technique is an in situ technique to quantify dynamic reservoir properties; it can obtain results much faster than core experiments, and the resulting properties are measured at a similar scale to that used in the reservoir simulations. Therefore, it is an appropriate method for dynamic reservoir evaluation. The method however has to make some assumptions with regard to the shape of the relative permeability curves for the inversion. The technique that relies on pressure alone also has uncertainty resulting from unknown skin related near wellbore damage.

In view of the above, a system, apparatus and method for improving the sensitivity of combined pressure and resistivity inversion, given the low radial resolution of an electrical measurement from a borehole is required. Indeed, it has been recognized that in the displacement of oil by brine, the salinity front carries with it a strong resistivity variation and is more easily detected than subtle resistivity profile changes behind a saturation front within the formation. Furthermore, the movement of strong resistivity changes associated with the salinity front carries with it information regarding the fractional flow characteristics of the formation.

SUMMARY OF THE INVENTION

It is therefore an object of this invention to propose a method and apparatus for improving the determination of at least one multiphase flow parameter whereby sensitivity is enhanced through induced salinity changes.

It is another object of the invention to provide a method and apparatus to estimate in situ relative permeability and capillary pressure at scales comparable to those used in reservoir simulation and other calculations.

In accord with the objects of the invention which will be discussed in more detail hereinafter, the method and apparatus of the invention broadly comprise providing more robust approaches for determining multiphase flow parameters, specifically by moving multiple salinity fronts through the reservoir.

According to one aspect of the invention, a method for improving the determination of at least one multiphase flow parameter of a formation traversed by a borehole, comprises:
  suspending a resistivity logging tool in the borehole;
  propagating with the resistivity logging tool at a first salinity front in the formation;
  detecting with the resistivity logging tool a first response, said first response being induced by the first salinity front and a saturation profile of the formation;
  determining from the first response a first value for the at least one multiphase flow parameter of the formation;
  propagating with the resistivity tool a second salinity front in the formation;
  detecting with the resistivity logging tool a second response, said second response being induced by the second salinity front and the saturation profile;
  determining an improved value of the at least one multiphase flow parameter of the formation from the first response, the second response and the first value of the at least one multiphase flow parameter.

Advantageously, the step of propagating a first salinity front comprises injecting a first fluid having a first salinity in the formation with the resistivity logging tool.

Preferably, the step of detecting a response with the resistivity logging tool comprises detecting a voltage or current shift between at least two electrodes or induction coils, said electrodes or induction coils being spaced apart from each other by a nominal spacing value along the axis of the resistivity logging tool.

In a preferred embodiment, the step of propagating the at least first salinity front comprises propagating the first salinity front at a first flow rate that pushes the at least first salinity front into the formation at a distance comparable to the nominal spacing value between the at least two electrodes or induction coils.

Preferably, the step of propagating a second salinity front comprises injecting a second fluid having a second salinity in the formation with the resistivity logging tool at a second flow rate, the second flow rate being preferably decreased compared to the first flow rate.

In preferred embodiment, the second salinity front is propagated in the formation after a time delay so the capillary diffusion of a saturation front associated with the first salinity front in the formation is allowed to become important.

Advantageously, the second salinity front is propagated in the formation when the at least first salinity front reaches a distance into the formation that is comparable to the nominal spacing value between the at least two electrodes or induction coils.

Preferably, the first salinity and the second salinity of the first and second fluids are different.

Advantageously, the method according to the invention further comprises propagating with the resistivity tool a third salinity front in the formation at a third flow rate, the third flow rate being increased compared to the second flow rate.

Advantageously, the third salinity front is propagated in the formation when the second salinity front reaches a distance into the formation that is comparable to two times the nominal spacing value between the at least two electrodes or induction coils.

Preferably, the at least one multiphase flow parameter includes at least one of relative permeability and capillary pressure.

In an advantageous embodiment, the method further comprises propagating in the formation a plurality of salinity fronts at a plurality of flow rates; detecting with the resistivity logging tool a plurality of responses, said responses being induced by the plurality of salinity fronts and by the saturation profiles associated with the salinity fronts; determining at least one multiphase flow parameter of the formation from iterative computations of the plurality of responses.

In accordance with the invention, it is provided a resistivity logging tool for improving the determination of at least one multiphase flow parameter within a formation traversed by a borehole, said resistivity logging tool comprising:
  means for propagating at least a first and a second salinity fronts in the formation;
  means for measuring electrical or electromagnetical responses induced by propagation of the first and second salinity fronts in the formation;
  processing means for:
    (i) receiving indications of the electrical or electromagnetical responses;

(ii) processing the electrical or electromagnetical responses to determine multiphase flow parameters of the formation, said processing step including combination of theoretical data for physics of fluid flow and resistivity with said electrical or electromagnetical responses (iii) storing determined values for said at least one multiphase flow parameter within said formation;

(iv) processing the determined values for said at least one multiphase flow parameter to obtain the resistivity profile of the formation.

Advantageously, the means for propagating at least a first and second salinity fronts in the formation comprises means for injecting at least a first and a second fluids under pressure into the formation and means for measuring a flow rate at which said at least first and second fluids are injected into the formation.

Preferably, the resistivity logging tool further comprises means for measuring the salinity of the fluid in the borehole adjacent to said resistivity logging tool.

Preferably, the resistivity tool further comprises isolating means located above the means for propagating at least the first and second salinity fronts into the formation. In a preferred embodiment, the isolating means comprises a packer, said packer being deployed when the at least first and salinity fronts are propagated into the formation.

In accordance with the invention, it is also provided a method for improving the determination of at least one multiphase flow parameter within a formation, the method comprising:

propagating a plurality of salinity discontinuities within the formation;

detecting the resistivity profiles of the formation induced by the propagation of a saturation profile and the salinity discontinuities deducing from the resistivity profiles the at least one multiphase flow parameter within the formation.

In further accord with the object of the invention, it is provided a method for enhancing sensitivity of a resistivity logging tool to at least one multiphase flow parameter of an underground formation comprising inducing multiple salinity fronts within the underground formation proximate to a borehole wherein the resistivity logging tool is lowered.

DETAILED DESCRIPTION OF THE INVENTION

Figure 1:
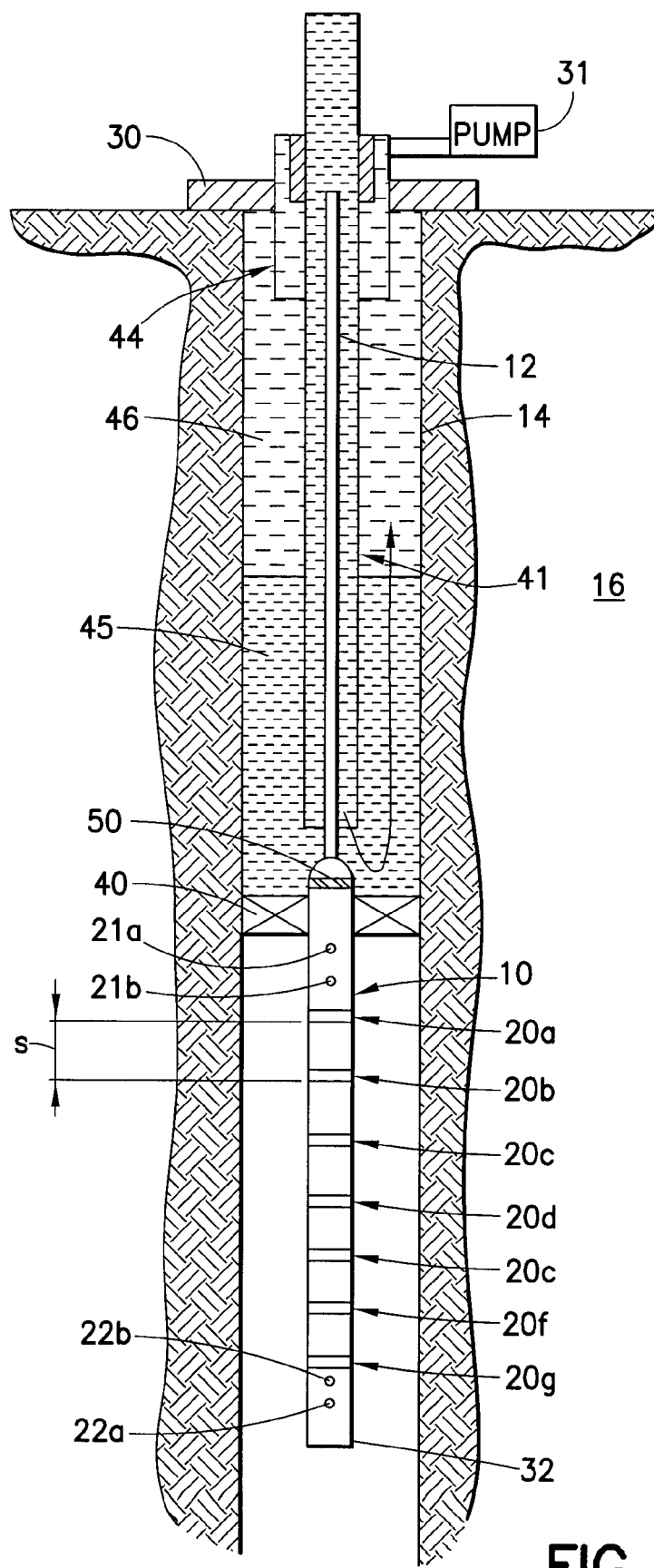
FIG. 1 is schematic diagram of the resistivity logging tool of the invention showing a dual tubing arrangement for use in practicing one embodiment of the present invention.

Recent experimental results relating to the evaluation of formation dynamic properties using deep electromagnetic, flow, and pressure measurements in an open-hole completion, have resulted in the development of a dedicated simulator, which integrates simulations of dynamic fluid flow, salt transportation, electrical potential distributions along with data inversion for use in interpreting and inverting experimental results obtained from field testing. For example, the time varying voltages at resistivity electrodes were found to be sensitive to formation heterogeneity, particularly, low permeability streaks, as well as connate water and residual oil saturations near the source electrodes, which in turn are parameters in relative permeability curves. Estimating these properties using the resistivity measurements at electrodes, in one non limitative example, is therefore possible and further results in an example of property measurement with a high reliability.

These findings successfully demonstrate the applicability and advantages of the technology for dynamic reservoir evaluations. Although very good history matching between the measurements and the simulation results are obtained, just as in the case of inversion from array induction logging, there is only a weak sensitivity to the details of the relative permeability curve shape and much less so for capillary pressure. Thus, estimating relative permeability and capillary pressure from history matching still has unresolved uncertainties. Further improvements in this area are needed.

In accordance with the present invention, numerous suitable hardware arrangements may be utilized in practicing the present invention. Suitable hardware configurations are detailed below. The recitation of these configurations is not intended to be limiting in scope and are provided for illustrative purposes in describing the invention. The description is given in reference to an electrode logging tool but an equivalent configuration may also be used like one with an array of induction coils as provided in the co-owned U.S. Pat. No. 5,157,605.

A resistivity logging tool 10 which is suspended from a conventional wireline cable 12 is seen in FIG. 1. The logging tool 10 is located in a borehole 14 which traverses a formation 16. According to the preferred embodiment of the invention, the logging tool includes a plurality of voltage measurement electrodes 20a-20g preferably equispaced by a nominal spacing value S. Each of the voltage measurement electrodes 20a-20g is preferably a ring electrode extending completely around the tool 10. According to the preferred embodiment of the invention, the logging tool also includes a pressure sensor (not shown) and two current emitting electrodes 21a, 21b, two current emitting electrodes 22a, 22b. The point electrodes 21a to 22b could also be ring electrodes. Alternatively, each of the voltage electrodes may be successively or in pairs used as a current injection electrode or injection/receiver pairs respectively. Typically, as is well known in the resistivity arts, and in accord with the present invention, current is generated and emitted by the emitting electrodes, and the resulting voltage signals which are detected by the measurement electrodes are recorded and processed. Preferably, the processing may occur downhole by use of a processor (not shown) and/or uphole in processing equipment (not shown); the information being transmitted uphole via the wireline cable 12. Typically, if processed downhole, a microprocessor is used. When processing uphole, a higher powered processor is used.

As seen in FIG. 1, and in accord with the invention, in order to obtain the desired information for processing, the borehole 14 is capped by a cap 30, and fluid (e.g., saline) is injected into the borehole through the cap by pumps 31. A flow gauge 32 for measuring a flow rate Q, is provided either on the tool (as shown) or in the flow path from the pumps into the borehole. The flow gauge 38 may be of a Venturi, spinner, or other type, with the spinner type being shown on the bottom of the tool string of the borehole tool in FIG. 1. As fluid is forced into the borehole and out into the formation, and as the salinity front advances through the formation, the logging tool 10 is moved up and down (one or more passes) in the borehole while logging resistivity, pressure, and if applicable, flow rate information.

To minimize the influence of salinity dispersion within the wellbore on the measured voltages, it is desirable to have a system whereby the dispersed zone is diverted until the requisite salinity change is seen and then injection into the formation commences. In one embodiment, a way to do this might be to inject successively lower salinities so that gravity keeps the injected fluid segregated. Because this cannot eliminate turbulent or laminar dispersion within the wellbore, the salinity or resistivity of the fluid adjacent to the tool may be measured and included as a part of an inversion model. Dispersion within the wellbore is then accounted for.

In another preferred embodiment, the resistivity logging tool 10 may include a packer 40 at the top of the tool (located above the interval of interest). The packer is deployed when a change in salinity is desired. The wellbore fluid above the packer may be replaced by pumping fluid through a coil tubing 41. The injected fluid may return via another coaxial coil tubing 44 mounted co-axially at the top of the wellhead. Thus a heavier fluid 45 (higher salinity) may be injected at the bottom and the lighter fluid 46 displaced.

When the replacement is complete, known by monitoring the conductivity of the return fluid at the top of the wellbore, the packer may be deflated and the higher salinity fluid injected into the formation by simultaneously shutting the return line. The central coil tubing 44 may be insulated to prevent interference with the electrical experiment or simply retracted to a higher location.

When lighter fluid is used to replace the heavier fluid one may inject through the annular coaxial coil tubing 44 at the top and have the central coil tubing 41 be the return line. When the return line is completely filled as indicated by a conductivity meter 50 at the top of the resistivity logging tool 10, the return line may be shut and the packer deflated to recommence the experiment. With the proposed hardware of the present embodiment, it is possible to replace a lighter or heavier injected fluid with another thus avoiding a large transition zone of salinity in the injected fluid.

It is to be noticed that, since the entire well interval is usually not open hole and a casing is likely to be present, a casing shoe (not shown) should be above the logging tool, usually tens of feet to avoid any perturbations within the logging tool measurements.

In accordance with one embodiment of the present invention, fluids of different salinity might be injected so that it creates plurality of salinity fronts propagating into the formation. This embodiment provides for an improvement of the sensitivity of the measurements to multiphase flow parameters, namely relative permeability and capillary pressure. To improve sensitivity to capillary pressure, in accordance with one embodiment of the invention, it is preferable to sense movement in a capillary pressure dominated regime. In general, it is beneficial to have the capillary pressure dominant mode at an early time, because of the sensitivity of the voltages to the near wellbore saturation and salinity profiles. This is better understood when knowing that in a displacement process, capillary pressure plays a leading role at the Buckley-Leverett saturation discontinuity as recited in S. E. Buckley and M. C. Leverett. "*Mechanism of fluid displacement in sands*" *Trans/AIME.*, 146: 107-116, 1942 and in H. J. Morel-Seytoux, "*Introduction to Flow of Immisicble Liquids in Porous Media, in Flow through Porous Media*", ed. J. M. Dewiest, Academic Press, 1969. Indeed, away from the saturation front, the saturation profiles are generally dominated by viscous pressure drops. Furthermore, it is also well-known to those in the practice of the art that the spread of the frontal region increases with decreasing flow rate, scaling as the inverse of the velocity. Thus, for sufficiently low injection rates, the saturation front spreads itself over larger distances. To improve information contained in the measured voltages (or current) by the logging tool, it is therefore advantageous according to the invention, to start with a rate that pushes the front to distances comparable to the nominal electrode spacing S, and then decrease the rate so as to increase the spread of the front.

In order to improve the signature of these regimes, and to improve sensitivity to the formation parameters in the measured voltages, it is desirable to change the salinity of the injected fluid frequently. In one embodiment of the present invention it is preferable to leave the salinity markers for a range of saturations. From the physics of flow in porous media as explained within T. S. Ramakrishnan and D. Wilkinson "*Formation producibility and fractional flow curves from radial resistivity variation caused by drilling fluid invasion*". *Phys. Fluids*, 9(4):833-844, 1997, it is quite difficult to leave these markers at all saturations, and measurements are confined to those regions that occur behind the front. The imposed salinity variations change the resistivity of the formation, without significantly altering the saturation profiles. Thus, any change in the measured voltage reflects the properties of those regions where the change in the salinity has occurred. Through repeated changes in the salinity, it is possible to capture more information about the water-flooded region, thus improving the overall quality of the determination of the multiphase flow parameters.

In accordance with one embodiment of the present invention the flow rate of injection of fluid into the formation may be ramped so that within a predefined time, the salinity front moves distances comparable to the nominal electrode spacing S. One non limiting predefined time period may be a 24 hours period. In accordance with one embodiment, if the nominal electrode spacing S is 30 cm, it may be preferable to push the salinity front to this distance over a day. When the estimated distance of the injected fluid front (as measured by salinity front) is roughly at a distance of the nominal spacing S between the electrodes, it is proposed that the flow rate is decreased and the salinity of the injected fluid is changed. In accordance with one embodiment of the present invention the salinity of the injected fluid (advantageously water) may be changed by a factor of two. This is solely an example of a suitable range and is not intended to be limiting in scope.

In the present embodiment, imposing the salinity change requires a time interval when the wellbore becomes quiescent, thus allowing capillary diffusion of the saturation front associated with the salinity front to dominate over propagation of the injected fluid into the formation. For a factor of two in salinity change, the near wellbore resistivity may change roughly by a factor of two also, and the electrodes close to the source would be sensitive to this change, whereas the farther spaced electrodes should not respond significantly to this change.

This adds an extra mode of sensitivity to the measurement. In accordance with one embodiment of the present invention, the salinity may be changed first when saturation profile dependence is still reflected at the voltage electrodes so as to maximize the information content. After further movement of the front (roughly an additional nominal electrode spacing), the flow rate of injection may be increased, with a second change in salinity either simultaneously or after a further delay. In accordance with one embodiment of the present invention, a suitable simulation may be used to evaluate the sensitivity of the data to the formation parameters with various experimental protocols (e.g. sequential salinity and flow rate changes or simultaneous changes).

In accordance with one embodiment of the present invention, a small flow rate increased with time may be used to allow the saturation front to sharpen as the velocity is increased, thus, capturing the effect of sharpening. Increasing the flow rate sharpens the saturation front, and the effect of sharpening might be lost if the front is far away the wellbore.

Processing the voltage or current indications from the logging tool to obtain multiphase flow parameters can be done in one embodiment of the invention, by using inversion method carried out entirely by history matching as disclosed in "*Estimating multiphase flow properties from dual-packer formation-tester interval tests and openhole array resistivity measurements*", M. Zeybek, T. S. Ramakrishnan, S. S. Al-Otaibi, S. P. Salamy, and F. J. Kuchuk 2004. *SPE Res. Eval. Eng [7]*, 40-46 or by an optimisation procedure using the governing flow equations with the petrophysics as discussed in co-owned U.S. Pat. No. 5,335,542, herein incorporated by reference in its entirety. Processing the voltage or current indications from the logging tool to obtain multiphase flow parameters can also be done using methods analogous to the ones outlined in co-owned U.S. Pat. Nos. 5,497,321, and 6,061,634, incorporated herein by reference. Each of which applies to specific geometry and downhole experiment. In principle, those methods combine the physics of fluid flow and resistivity, with those of the models of electrical or electromagnetic measurements and invert for the relevant multiphase flow parameter that underline the model.

In accordance with an alternative embodiment of the present invention the injected fluid might be allowed to flow back into the wellbore, thereby forming a saturation discontinuity at a different point of the fractional flow curve and the previously formed shock becomes progressively small (P. S. Hammond. "*One and two-phase flow during fluid sampling by a wireline tool*". Trans. Porous Media, 6:299-330, 1991). Since saturation discontinuities around the wellbore cause a notable signal at the measurement electrodes, a flow back of the fluids will add extra information for improving inversion.

The foregoing description is presented for purposes of illustration and description, and is not intended to limit the invention in the form disclosed herein. Consequently, variations and modifications to the inventive method and apparatus for determining at least one multiphase flow parameter described commensurate with the above teachings, and the teachings of the relevant art, are deemed within the scope of this invention. These variations will readily suggest themselves to those skilled in the relevant oilfield, machining, and other relevant industrial art, and are encompassed within the scope of the following claims. Moreover, the embodiments described (e.g., use of packer means, sequence of salinity fronts) are further intended to explain the best mode for practicing the invention, and to enable others skilled in the art to utilize the invention in such, or other, embodiments, and with various modifications required by the particular applications or uses of the invention. It is intended that the appended claims be construed to include all alternative embodiments to the extent that it is permitted in view of the applicable prior art.

What is claimed is:

1. A method for improving the determination of at least one multiphase flow parameter of a formation traversed by a borehole, comprising:
    suspending a resistivity logging tool in the borehole;
    propagating with the resistivity logging tool at a first salinity front in the formation;
    detecting with the resistivity logging tool a first response, said first response being induced by the first salinity front and a saturation profile of the formation;
    determining from the first response a first value for the at least one multiphase flow parameter of the formation;
    propagating with the resistivity tool a second salinity front in the formation;
    detecting with the resistivity logging tool a second response, said second response being induced by the second and the first salinity fronts and the saturation profile;
    determining an improved value of the at least one multiphase flow parameter of the formation from the first response, the second response and the first value of the at least one multiphase flow parameter.

2. A method for improving the determination of at least one multiphase flow parameter according to claim 1, wherein the at least one multiphase flow parameter includes at least one of relative permeability and capillary pressure.

3. A method for improving the determination of at least one multiphase flow parameter according to claim 1, further comprising:
    propagating in the formation a plurality of salinity fronts at a plurality of flow rates;
    detecting with the resistivity logging tool a plurality of responses, said responses being induced by the plurality of salinity fronts and by the saturation profiles associated with the salinity fronts;
    determining at least one multiphase flow parameter of the formation from iterative computations of the plurality of responses.

4. A method for improving the determination of at least one multiphase flow parameter according to claim 1, wherein the step of propagating a first salinity front comprises injecting a first fluid having a first salinity in the formation with the resistivity logging tool.

5. A method for improving the determination of at least one multiphase flow parameter according to claim 4, wherein the step of detecting a first or second response with the resistivity logging tool comprises detecting a voltage or current shift between at least two electrodes or induction coils, said electrodes or induction coils being spaced apart from each other by a nominal spacing value along the axis of the resistivity logging tool.

6. A method for improving the determination of at least one multiphase flow parameter according to claim 5, wherein the step of propagating the at least first salinity front comprises propagating the first salinity front at a first flow rate that pushes the at least first salinity front into the formation at a distance comparable to the nominal spacing value between the at least two electrodes or induction coils.

7. A method for improving the determination of at least one multiphase flow parameter according to claim 6, wherein the step of propagating a second salinity front comprises injecting a second fluid having a second salinity in the formation with the resistivity logging tool at a second flow rate, the second flow rate being preferably decreased compared to the first flow rate.

8. A method for improving the determination of at least one multiphase flow parameter according to claim 7, wherein the second salinity front is propagated in the formation after a time delay so the capillary diffusion of a saturation front associated with the first salinity front in the formation is allowed to become important.

9. A method for improving the determination of at least one multiphase flow parameter according to claim 8, wherein the second salinity front is propagated in the formation when the at least first salinity front reaches a distance into the formation that is comparable to the nominal spacing value between the at least two electrodes or induction coils.

10. A method for improving the determination of at least one multiphase flow parameter according to claim 9, wherein the first salinity and the second salinity of the first and second fluids are different.

11. A method for improving the determination of at least one multiphase flow parameter according to claim 7, further comprising propagating with the resistivity tool a third salinity front in the formation at a third flow rate, the third flow rate being increased compared to the second flow rate.

12. A method for improving the determination of at least one multiphase flow parameter according to claim 11, wherein the third salinity front is propagated in the formation when the second salinity front reaches a distance into the formation that is comparable to two times the nominal spacing value between the at least two electrodes or induction coils.

13. A resistivity logging tool for improving the determination of at least one multiphase flow parameter within a formation traversed by a borehole, said resistivity logging tool comprising:
   means for propagating at least a first and a second salinity fronts in the formation;
   means for measuring electrical or electromagnetical responses induced by propagation of the first and second salinity fronts in the formation;
   processing means for:
      (i) receiving indications of the electrical or electromagnetical responses;
      (ii) processing the electrical or electromagnetical responses to determine multiphase flow parameters of the formation, said processing step including combination of theoretical data for physics of fluid flow and resistivity with said electrical or electromagnetical responses
      (iii) storing determined values for said at least one multiphase flow parameter within said formation;
      (iv) processing the determined values for said at least one multiphase flow parameter to obtain the resistivity profile of the formation.

14. A resistivity logging tool according to claim 13, wherein the means for propagating at least a first and second salinity fronts in the formation comprises means for injecting at least a first and a second fluids under pressure into the formation and means for measuring a flow rate at which said at least first and second fluids are injected into the formation.

15. A resistivity logging tool according to claim 13, further comprising means for measuring the salinity of the fluid in the borehole adjacent to said resistivity logging tool.

16. A resistivity logging tool according to claim 13, further comprising isolating means located above the means for propagating at least the first and second salinity fronts into the formation.

17. A resistivity logging tool according to claim 16, wherein the isolating means comprises a packer, said packer being deployed when the at least first and salinity fronts are propagated into the formation.

18. A method for improving the determination of at least one multiphase flow parameter within a formation, the method comprising:
   propagating a plurality of salinity discontinuities within the formation;
   detecting the resistivity profiles of the formation induced by the propagation of a saturation profile and due to the salinity discontinuities;
   deducing from the resistivity profiles the at least one multiphase flow parameter within the formation.

19. A method for enhancing sensitivity of a resistivity logging tool to at least one multiphase flow parameter of an underground formation comprising inducing multiple salinity fronts within the underground formation proximate to a borehole wherein the resistivity logging tool is lowered.

* * * * *